May 29, 1956  R. LEE  2,748,333
INDUCTION MOTORS
Filed April 5, 1952  2 Sheets-Sheet 2
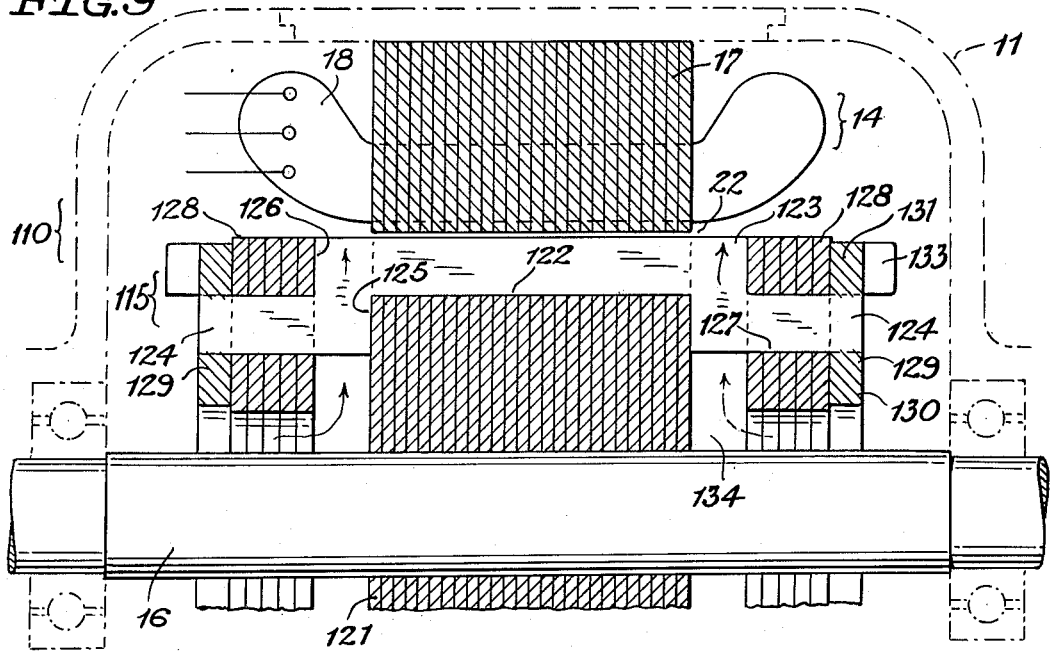
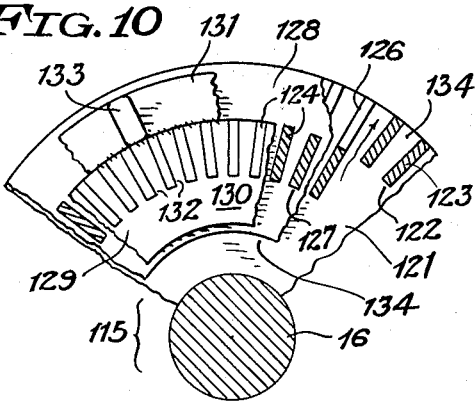
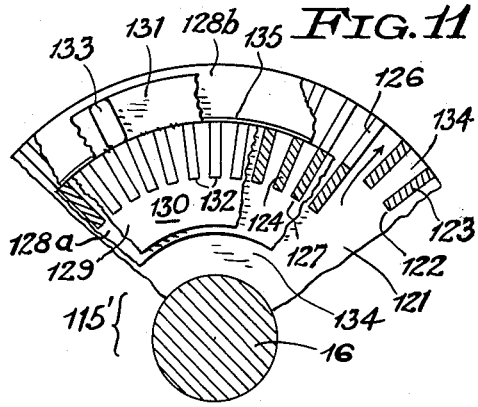
INVENTOR
ROYAL LEE
BY Christopher L. Waal
ATTORNEY United States Patent Office 2,748,333
Patented May 29, 1956

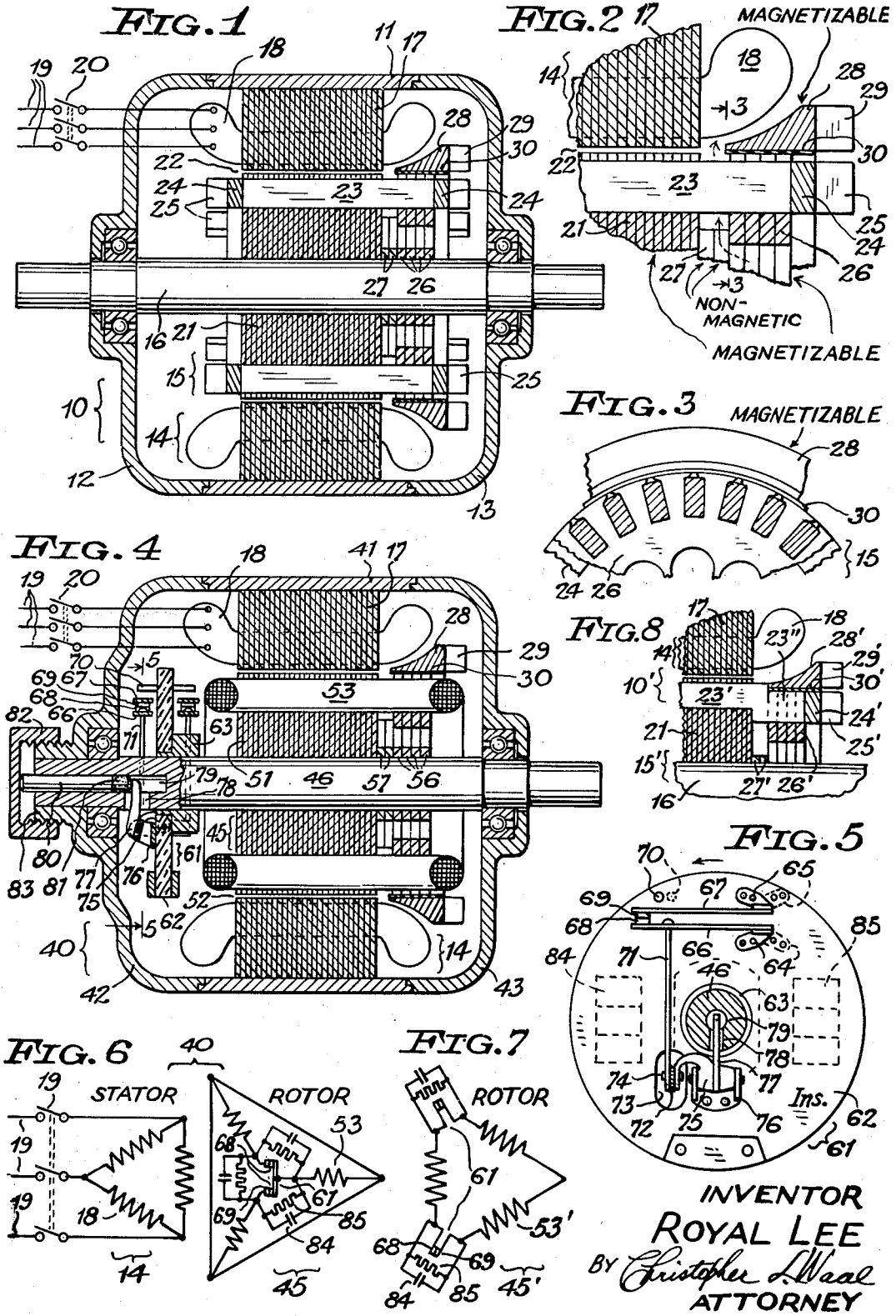

2,748,333

INDUCTION MOTORS

Royal Lee, Elm Grove, Wis.

Application April 5, 1952, Serial No. 280,806

7 Claims. (Cl. 318—232)

The present invention relates to induction motors.

An object of the invention is to provide an induction motor embodying improved and simplified means for automatically increasing the effective secondary resistance of the motor at starting, so as to reduce the starting current and increase the starting torque.

Another object is to provide an induction motor starting means which can readily be incorporated in either a squirrel-cage or phase-wound secondary.

Still another object is to provide a wound-rotor induction motor having improved speed regulating means by which the motor may be operated at various governed speeds with satisfactory power output.

A further object is to provide an adjustable speed induction motor of this character which will obviate the need for collector ring connections.

A still further object is to provide an induction motor which is of simple and reliable construction and is capable of inexpensive manufacture.

The invention further consists in the several features hereinafter described and claimed.

In the drawing, illustrating certain embodiments of the invention,

Fig. 1 is a longitudinal sectional elevation of a squirrel-cage induction motor constructed in accordance with the invention;

Fig. 2 is an enlarged sectional view showing a rotor end construction;

Fig. 3 is a detail sectional view taken generally on the line 3—3 of Fig. 2;

Fig. 4 is a longitudinal sectional elevation of a modified form of induction motor with a wound rotor and incorporating a speed control;

Fig. 5 is a view of a speed governing switch of the motor of Fig. 4, parts being shown in section on the line 5—5 of Fig. 4;

Fig. 6 is a circuit diagram of the motor of Fig. 4;

Fig. 7 shows a modified form of rotor circuit for the motor of Fig. 4;

Fig. 8 is a sectional view, similar to Fig. 2, showing a modified form of squirrel-cage motor;

Fig. 9 is a longitudinal sectional view of another modified form of squirrel-cage motor;

Fig. 10 is an end view of the motor rotor of Fig. 9, parts being broken away and parts being shown in section, and Fig. 11 is a similar end view of a modified rotor.

Referring to Figs. 1 to 3, the numeral 10 designates one form of induction motor embodying the invention. The motor includes a frame 11 of any usual type, here shown to have end bells 12 and 13. The frame has mounted therein a stator member 14 which cooperates with a rotor member 15 carried on a shaft 16 suitably journalled in the end bells of the frame.

The stator member 14 is of conventional construction and includes a laminated stator core 17 of annular shape having a longitudinally slotted, cylindrical inner periphery and carrying a primary winding 18, preferably of three-phase type. The primary winding is here shown to be connected to three-phase line conductors 19 by a switch 20. In the case of a single-phase motor, any usual provision is made to effect starting of the motor.

The rotor member 15 includes a laminated, longitudinally slotted, cylindrical core 21 mounted on the shaft 16 and rotatable in the cylindrical tunnel of the stator core, there being a small radial air gap 22 between the two cores. The rotor core is provided with a squirrel-cage winding comprising low-resistance conductor bars 23, as of copper or aluminum, connected to low-resistance end rings 24. The low-resistance conductor bars 23 are close to the air gap and may either be inserted in the slotted core or be cast therein integrally with the end rings. The conductor bars may be either skewed or straight, as desired, and the end rings are provided with fanning vanes 25.

The rotor member 15 further includes a magnetizable coaxial core section 26 which extends axially beyond the air gap of the motor and is preferably axially separated from the main rotor core 21 by a non-magnetic spacer section 27, or by merely an air space. The extension core section 26 and the spacer section 27 are slotted like the main core section and are shown to be laminated, although the core section 26 may in some instances be of molded or sintered construction. In the case of a laminated structure, the core section laminations may, if desired, be thicker than those of the main rotor core 21. The rotor conductor bars 23 extend to the outer side of the extension core section 26, and one of the end rings 24 is located at this region.

A magnetizable ring or collar 28, such as a malleable iron casting, is pressed onto the extension core section 26 of the rotor and preferably has an axial dimension greater than that of the core section so as to project beyond each end of the core section and to extend over the adjacent end ring 24. The collar, which carries fanning vanes 29 at its outer side, is suitably spaced from the adjacent end portion of the stator winding, and tapers inwardly in cross-section. In some instances, a thin, non-magnetic sleeve or liner 30, such as of metal, is interposed between the collar and the extension core section to reduce and adjust rotor reactance, the sleeve increasing the reluctance between the core section and the collar. The rotor conductor bars extend through the magnetizable body formed by the core section 26 and the surrounding collar.

The extension core section 26 and the magnetizable collar 28 thereon cooperate with the adjacent portions of the squirrel-cage winding to form a means for producing eddy currents at high rotor frequencies, thereby increasing the effective rotor resistance at starting so that the motor will have a low starting current and adequate starting torque. The increase in effective rotor resistance can be adjusted by varying the axial position of the collar on the rotor member. The exposed position of the rotary eddy current collar insures adequate cooling.

When the motor of Fig. 1 is to be operated, the primary or stator winding 18 is connected to the line conductors 19 by the switch 20, thus inducing a voltage in the rotor winding and causing a torque-producing current to flow therein. At starting, the rotor current frequency is equal to the line frequency, and the eddy currents flowing in the magnetizable collar 28 and sleeve 30, and also to some extent in the core section 26, cause an increase in the effective rotor resistance, thereby providing ample starting torque at a low starting current. Some hysteresis loss may also be present and influence the effective rotor resistance. As the rotor accelerates to its normal speed, the rotor current frequency decreases and the eddy current loss correspondingly drops, thus gradually reducing the effective rotor resistance and maintaining the torque. At normal motor speed, the slip is low and the eddy current loss drops to a small value, as does also the hysteresis loss, so that the rotor resistance is then relatively small. The low resistance rotor conductor bars 23 are close to the air gap, which is a desirable relation.

The magnetizable rotor core section 26 is shown to be placed at one end of the rotor core 21, but this core section may, if desired, be placed at both ends of the rotor core. The invention is also applicable to various other types of induction motors, such as the type in which the rotor surrounds the stator, and the axial air gap type.

The modified form of induction motor 40 shown in Figs. 4 to 6 is of the wound-rotor type and also includes speed-regulating means hereinafter described. The motor 40 has a frame 41 of conventional type provided with end bells 42 and 43. In the frame is mounted a stator member 14, like that of the motor of Fig. 1, cooperating with a rotor member 45 carried on a shaft 46 journalled in the frame end bells.

As in the motor of Fig. 1, the stator member 14 includes a stator core 17 having a primary winding 18 of three-phase type connected to line conductors 19 by a switch 20.

The rotor member 45 includes a laminated, slotted rotor core 51 similar to the rotor core 21 of Fig. 1 and mounted on the shaft 46 to rotate in the stator core 17, there being a small radial air gap 52 between the two cores. The rotor core is provided with a three-phase secondary winding 53, shown to be star-connected in Fig. 6. The rotor member 45 further includes a magnetizable core section 56 extending beyond the air gap and preferably separated from the rotor core 51 by a non-magnetic spacer section 57, the arrangement being similar to that in the rotor member of Fig. 1. The rotor core section 56 carries a magnetizable collar 28 with fanning vanes 29, and in some instances a thin, non-magnetic sleeve 30, as in the motor of Fig. 1.

The rotor winding sections are connected in circuit by a multiple-section speed-responsive switch 61 mounted on and rotatable with the motor shaft 46, the switch being arranged to simultaneously open the rotor winding circuits upon increase in motor speed. Preferably, the switch, when closed, forms the junction of the rotor winding sections, as seen in Fig. 6. The switch comprises an insulating disk 62 having a hub 63 secured to the motor shaft. Two pairs of brackets 64 and 65 are secured to opposite sides of the disk and carry respective inner and outer cantilever leaf springs 66 and 67 arranged in tangential relation. The free ends of each pair of leaf springs carry cooperating contacts 68 and 69 to form a circuit closer. The contact-carrying outer leaf springs 67 form centrifugally influenced reeds, and their maximum outward movement under centrifugal force is limited by stop pins 70 secured to the disk. The inner leaf springs 66 are connected for simultaneous displacement by links 71 the inner ends of which are attached to a cross piece or cross bar 72 extending through an opening 73 in the disk 62. The cross bar 72 has a pivotal connection 74 at its middle portion with an arm of a bell-crank lever 75, the lever being pivotally mounted on a bracket 76 secured to one face of the disk on the opposite side of the shaft axis from the leaf springs, and the lever axis extending transversely of the shaft axis. The lever 75 includes a blade-like arm 77 disposed in the plane of the motor shaft and extending into a slot 78 formed radially in the shaft. An axial bore 79 in the shaft communicates with the slot 78 and opens at an end of the shaft. A plunger 80 slidably extending in the shaft bore has an insulating inner end 81 abutting against the lever arm 77, and has its outer end abutting against the inner face of a screw cap 82 threaded onto a central boss 83 of the motor from end bell 42. Axial adjustment of the screw cap 82 will angularly shift the bell-crank lever 75 to adjust the position of the contact spring 66 and thereby determine the speed of rotation at which the switch contacts will separate.

The mounting brackets of the speed-setting, contact-carrying leaf springs 66 are electrically connected to one of the sections of the rotor winding, and the mounting brackets of the two vibratile reed-forming leaf springs 67 are electrically connected to the other two sections of the rotor windings, the centrifugal switch sections thus forming the common junction of the star-connected winding sections, as seen in Fig. 6. Capacitors 84 and resistors 85 are shunted across the switch contacts for spark suppression, and are suitably carried on the disk 61 or other parts of the rotor member. The capacitors will also improve the power factor. Since the centrifugal switch rotates with the rotor member there is no need for slip rings and brushes.

When the motor of Fig. 4 is to be operated, the primary winding 18 is connected to the supply conductors 19, thus causing a torque-producing current to flow in the secondary-forming rotor winding 53. As in the motor of Fig. 1, the effective resistance of the rotor is considerably increased at starting by reason of the eddy current action, so that adequate starting torque is provided with a low line current. The effective rotor resistance decreases as the motor speed increased, thus maintaining the torque and permitting the motor to operate at normal speed and load. If the speed setting of the centrifugal switch 61 is higher than the normal maximum motor speed, the motor will accelerate to such speed and the switch will not operate. However, when it is desired to operate the motor at some lower predetermined speed the speed setting of the centrifugal switch is adjusted accordingly by the screw cap 82, and as soon as the motor reaches such predetermined speed, the switch contacts will open, thus opening the rotor circuit at each phase winding, whereupon the motor speed will drop slightly, reclosing the switch contacts, and the cycle of operation will be repeated. The centrifugal switch opens and closes at a relatively high frequency, say from 50 to 500 cycles per second, thus insuring good speed regulation.

In Fig. 7, the rotor winding 53' is shown to be delta-connected, and the two switch sections of the speed regulating switch 61 are connected to form two of the junctions of the winding sections, so as to interrupt the rotor circuits and to divide the break voltage. As in Fig. 6, each switch section is preferably shunted by a capacitor 84 and a resistor 85. The operation of the motor with the rotor winding of Fig. 7 is substantially the same as that of the motor of Fig. 6.

In the modified form of squirrel-cage motor 10' shown in Fig. 8, the stator member 14 is the same as in Fig. 1, but the rotor member 15' includes a magnetizable extension section 26' and a spacer section 27' which are reduced in diameter. The squirrel-cage winding includes low-resistance conductor bars 23' which have inwardly offset end portions 23" extending in the slotted members 26' and 27' and are connected to a low-resistance end ring 24' provided with fanning vanes 25'. A magnetizable collar 28', similar to the collar 28 of Fig. 1, is pressed onto the reduced-diameter core section 26' and is provided with fanning vanes 29'. In some instances, a non-magnetic sleeve or liner 30' is interposed between the collar and the core section. By the construction above described, the magnetizable eddy-current collar 28' can be spaced a considerable distance from the end portions of the stator winding without increasing the axial length of the rotor. If desired, the end portions 23" of the rotor conductor bars may be deepened and narrowed so as to obtain a skin effect which will add to the eddy current effect for increasing the rotor resistance at starting. The main portions 23' of the low-resistance conductor bars, however, are close to the air gap, as in the motor of Fig. 1.

The modified form of squirrel-cage induction motor 110 shown in Figs. 9 and 10 has a frame 11 and stator member 14 like those of Fig. 1, and a rotor member 115 which includes a laminated cylindrical rotor core 121 rotatable in the annular stator core 17 and mounted on a suitably journalled shaft 16, there being a small radial air gap 22 between the two cores. The rotor core is provided with narrow, parallel-sided radial slots 122 extending longitudinally of the core and receiving flat copper conductor bars 123 with inwardly offset opposite end portions 124 forming shoulders 125 and 126, the shoulders 125 engaging the opposite ends of the rotor stack. The bar end portions 124 extend through radial slots 127 in magnetizable reactor core sections 128 which are in tandem to, but spaced from the opposite ends of the rotor core by the offsets in the conductor bars, so as to be out of the main field of the stator member. Each core section 128 is here shown to be formed of laminations which, however, may be somewhat thicker than those of the rotor core to favor the production of eddy currents. The core sections are confined between the bar shoulders 126 and the flat inner faces of low-resistance end rings 129 which are brazed or welded to the bars. Each end ring is formed of inner and outer annular parts 130 and 131, the inner part having outwardly opening radial slots 132 receiving the bar ends, and the outer part 131 being snugly fitted over the inner part and having fanning vanes 133. A ventilating passage 134 is formed between the rotor core section 121 and each extension core section 128, this passage also extending between the extension core section and the rotor shaft. The offset portions of the rotor conductor bars present extended radial cooling surfaces which are swept by air currents flowing outwardly in the ventilating passages.

As in the other motors hereinbefore described, the action of the rotor is such as to increase the effective rotor resistance at starting, so that the motor will have a relatively low starting current and adequate starting torque. The frequency-responsive rotor losses, which are mainly eddy current losses, are gradually reduced to a relatively small value as the motor accelerates to its normal speed.

The modified form of rotor 115' shown in Fig. 11 is similar to that of Fig. 10 except that the extension core section is formed of complementary inner and outer members 128a and 128b, like the end rings. This will increase the reluctance of the reactor core body traversed by the rotor conductor bars. In some instances, a thin non-magnetic liner or sleeve 135 may be interposed between the inner and outer core members for reducing and adjusting the inductance effect.

What I claim as new and desire to secure by Letters Patent is:

1. In an induction motor, a stator member having a core with a primary winding, a rotor member having a core with a secondary winding, there being a radial air gap between said cores, and a magnetizable body on said rotor member in tandem relation to the core member thereof and traversed by said secondary winding for inducing eddy currents therein to increase the effective resistance of said secondary winding during starting, said magnetizable body comprising a magnetizable section receiving said secondary winding and a magnetizable eddy-current collar surrounding said magnetizable section, said collar being of wedge-shaped cross-section and tapering inwardly toward said rotor core.

2. In an induction motor, relatively rotatable motor members with respective core members one with a primary winding and the other with a polyphase secondary winding, frequency-responsive means carried by the secondary motor member for increasing the effective resistance of said secondary winding during starting, and speed-regulating switch means rotatable with the rotatable core member and opening upon increase of motor speed and closing upon decrease of motor speed, said switch means being connected in circuit with the phases of the secondary winding to interrupt current flow in each of said phases for controlling the speed of the motor.

3. In an induction motor, a stator member having a primary winding, a rotor member having a polyphase secondary winding, frequency-responsive means carried by said rotor member for increasing the effective resistance of said secondary winding during starting, and speed-responsive switch means rotatable with said rotor member and opening upon increase of motor speed and closing upon decrease of motor speed, said switch means being connected in circuit with the phases of the secondary winding to interrupt current flow in each of said phases for controlling the speed of the motor.

4. In an induction motor having relatively rotatable core members with respective primary and polyphase secondary windings, and a speed-regulating switch rotatable with one of said core members and opening upon increase of motor speed and closing upon decrease of motor speed, said switch being connected in circuit with the phases of the secondary winding to interrupt current flow in each of said phases for controlling the speed of the motor.

5. In an induction motor having relatively rotatable core members with respective primary and polyphase secondary windings, a speed-regulating switch rotatable with one of said core members and opening upon increase of motor speed and closing upon decrease of motor speed, said switch being connected in circuit with the phases of the secondary winding to interrupt current flow in each of said phases for controlling the speed of the motor, and means for adjusting the speed setting of said switch to vary the motor speed.

6. In an induction motor, a stator member having a primary winding, a rotor member having a polyphase secondary winding, and a speed-regulating switch rotatable with said rotor member and opening upon increase of motor speed and closing upon decrease of motor speed, said switch being connected in circuit with the phases of said secondary winding to interrupt current flow in each of said phases for controlling the speed of the motor.

7. In an induction motor, a stator member having a primary winding, a rotor member having a polyphase secondary winding, and a speed-regulating switch rotatable with said rotor member and opening upon increase of motor speed and closing upon decrease of motor speed, said switch having a plurality of switch sections connected in circuit with different phases of said secondary winding to interrupt current flow in each of said phases for controlling the speed of the motor.

References Cited in the file of this patent

UNITED STATES PATENTS

| Number | Name | Date |
|---|---|---|
| 771,269 | Reist | Oct. 4, 1904 |
| 780,547 | Wiard | Jan. 24, 1905 |
| 856,433 | Tornberg | June 11, 1907 |
| 984,582 | McCollum | Feb. 21, 1911 |
| 991,626 | Lord | May 9, 1911 |
| 1,031,802 | McCollum | July 9, 1912 |
| 1,049,703 | Gray | Jan. 7, 1913 |
| 1,079,332 | Fynn | Nov. 25, 1913 |
| 1,134,776 | Thompson | Apr. 6, 1915 |
| 1,156,364 | McCollum | Oct. 12, 1915 |
| 1,174,654 | Bergman | Mar. 7, 1916 |
| 1,190,243 | McMahan | July 4, 1916 |
| 1,527,332 | Rudenberg | Feb. 24, 1925 |
| 1,694,061 | Hansen et al. | Dec. 4, 1928 |
| 1,743,818 | Hansen et al. | Jan. 14, 1930 |
| 1,767,146 | Lee | June 24, 1930 |
| 1,823,337 | Sheely | Sept. 15, 1931 |